(12) United States Patent
Swayne et al.

(10) Patent No.: US 7,854,101 B2
(45) Date of Patent: Dec. 21, 2010

(54) SYSTEM FOR ATTACHING COMPONENTS TO A VEHICLE

(75) Inventors: Andrew K. Swayne, Dublin, OH (US); Jeremy J. Weinandy, Dublin, OH (US)

(73) Assignee: Honda Motor Co., Ltd, Tokyo (JP)

( * ) Notice: Subject to any disclaimer, the term of this patent is extended or adjusted under 35 U.S.C. 154(b) by 804 days.

(21) Appl. No.: 11/735,755

(22) Filed: Apr. 16, 2007

(65) Prior Publication Data

US 2008/0251667 A1    Oct. 16, 2008

(51) Int. Cl.
*E04C 2/38* (2006.01)

(52) U.S. Cl. .................. 52/716.5; 52/288.1; 52/718.05; 296/1.08; 428/31

(58) Field of Classification Search ................. 296/1.08; 52/288.1, 716.5, 718.05, 512; 428/31
See application file for complete search history.

(56) References Cited

U.S. PATENT DOCUMENTS

| | | | |
|---|---|---|---|
| 3,580,628 A | 5/1971 | Rantala | |
| 4,353,529 A * | 10/1982 | Brown | .......................... 256/59 |
| 4,398,984 A | 8/1983 | Uchiyama et al. | |
| 4,542,933 A | 9/1985 | Bischoff | |
| 5,095,659 A | 3/1992 | Benoit et al. | |
| 5,096,753 A | 3/1992 | McCue et al. | |
| 5,186,509 A * | 2/1993 | Tyves | ........................ 52/716.5 |
| 5,325,632 A | 7/1994 | Djavairian et al. | |
| 5,353,571 A | 10/1994 | Berdan et al. | |
| 6,139,089 A | 10/2000 | Troyer | |
| 6,267,439 B1 | 7/2001 | Aoyama | |
| 6,276,109 B1 | 8/2001 | Hingorani et al. | |
| 6,368,008 B1 | 4/2002 | Biernat et al. | |
| 6,662,424 B2 | 12/2003 | Ehrlich | |
| 6,722,730 B2 | 4/2004 | Lydan et al. | |
| 6,749,254 B1 | 6/2004 | Kleven et al. | |
| 6,782,623 B1 | 8/2004 | Gerzeny et al. | |
| 6,910,722 B2 * | 6/2005 | Takeda et al. | ............... 293/128 |
| 2002/0043041 A1 | 4/2002 | Yoyasu | |
| 2003/0230044 A1 | 12/2003 | Peterson | |

\* cited by examiner

*Primary Examiner*—Brian E Glessner
*Assistant Examiner*—Daniel Kenny
(74) *Attorney, Agent, or Firm*—Gregory J. Burke; Michael A. Forhan; Eley Law Firm Co.

(57) ABSTRACT

A system for attaching a component to a substrate, such as a vehicle. The system comprises a bracket. At least one fastener is coupled to the bracket and is engageable to the vehicle. A component is assembled to the bracket such that a lip of the component contacts a tab of the bracket, and the bracket at least partially engages a gap defined by the lip and an interior surface of the component. The component is attached to the vehicle when the fastener is engaged with the vehicle. A method employs the system.

22 Claims, 5 Drawing Sheets

SYSTEM FOR ATTACHING COMPONENTS TO A VEHICLE

FIELD OF THE INVENTION

The present invention relates generally to a system for attaching components to a vehicle, in particular a system for attaching components to the exterior of the vehicle.

BACKGROUND

Vehicle exteriors typically include components attached thereto that aid to form the shape of the body or accentuate the styling of the vehicle. Example components include fender flares, cladding, panels, ground effects, scoops and trim pieces, among others. These components are typically made from a plastic material and thus are lighter than their metal counterparts. Plastic components are also less susceptible to environmental degradation and damage from minor impacts.

Attaching plastic components to metal substrates of the vehicle, such as body panels, poses several problems. First, plastic and metal are incompatible for welding. Consequently, the components must be secured to the substrate with adhesives or mechanical fasteners. However, mounting a component in this way can be problematic due to inherent differences in the rates of thermal expansion for plastic and metal, which can cause deformation of the component if it is rigidly attached to the metal substrate. Such distortion is easily visible to an observer and detracts from the esthetics of the vehicle.

Another drawback of using plastic body components is the need to include molded-in mounting structures such as recesses or "doghouses" that accommodate common fasteners for attaching the component to the vehicle. These attachment structures can cause slide marks, sink marks, recesses, dimples and other visible imperfections on the exterior surface of the component. These flaws, which are inherent to molded components having complex geometries, detract from the esthetics of the vehicle.

There is a need for a way to attach components to the exterior of a vehicle without the need for a molded-in fastener attachment feature that can cause visible surface imperfections. There is a further need for a way to attach components that provides for thermal expansion of the components.

SUMMARY

A system for attaching components to a vehicle is disclosed. The system overcomes the limitations of the prior art by allowing the components to be attached to the vehicle without the use of molded-in attachment structures. The system also allows for lateral movement of the components to compensate for thermal expansion and contraction. The system utilizes a component design having a lip that engages a bracket and rests upon tabs extending from the bracket. The bracket includes fasteners for attaching the component to the vehicle. The component's movement is then restricted in all directions except laterally, due to interference between the component, the bracket and the vehicle.

An aspect of the present invention is a system for attaching a component to a substrate. The system comprises a bracket. At least one fastener is coupled to the bracket and is engageable to the substrate. A component is assembled to the bracket such that a lip of the component contacts a tab of the bracket, and the bracket at least partially engages a gap defined by the lip and an interior surface of the component. The component is attached to the substrate when the fastener is engaged with the substrate.

Another aspect of the invention is a method for attaching a component to a substrate. The method comprises the steps of selecting a bracket, coupling at least one fastener to the bracket, and assembling a component to the bracket such that a lip of the component contacts a tab of the bracket and the bracket at least partially engages a gap defined by the lip and an interior surface of the component. Finally, the fastener is engaged to a receptacle of the substrate such that the component is attached to the substrate.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
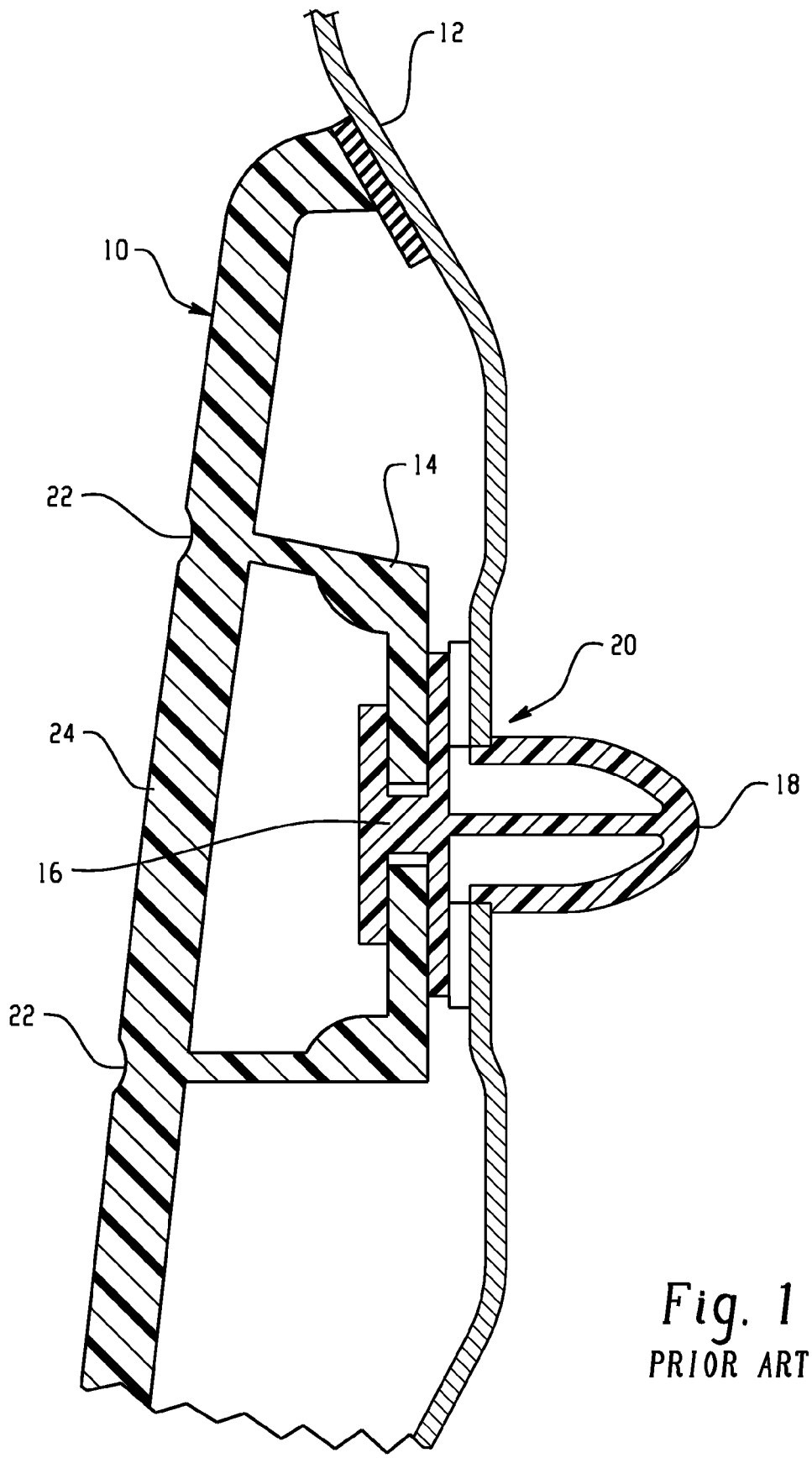
FIG. 1 is a view in section of a prior art component attached to a metal substrate.

FIG. 1 shows a view in section of a prior art plastic component 10, such as cladding, assembled to a body panel 12 of a vehicle. Component 10 includes a molded-in fastener housing 14 having a fastener aperture 16, into which a fastener 18 is installed. Fastener 18 is coupled to a mounting aperture 20 of body panel 12, thus securing component 10 to the body panel. This assembly system suffers from several shortcomings. First, as can be seen in FIG. 1, the molding process utilized to form the fastener housing 14 often results in depressions or irregularities such as sink marks 22. The sink marks 22 are caused by variations in the flow of molten plastic material in the mold used to form component 10, and by uneven heating and cooling in the mold. These flaws often appear on an exterior surface 24 of component 10, detracting from the esthetics of the component.

Another drawback of the assembly of FIG. 1 is that the component 10 is rigidly attached to body panel 12 by fastener 18. Since plastic component 18 and metal body panel 12 have different rates of thermal expansion, the component is subject to distortion and warping that can detract from the esthetics of the vehicle.

Figure 2:
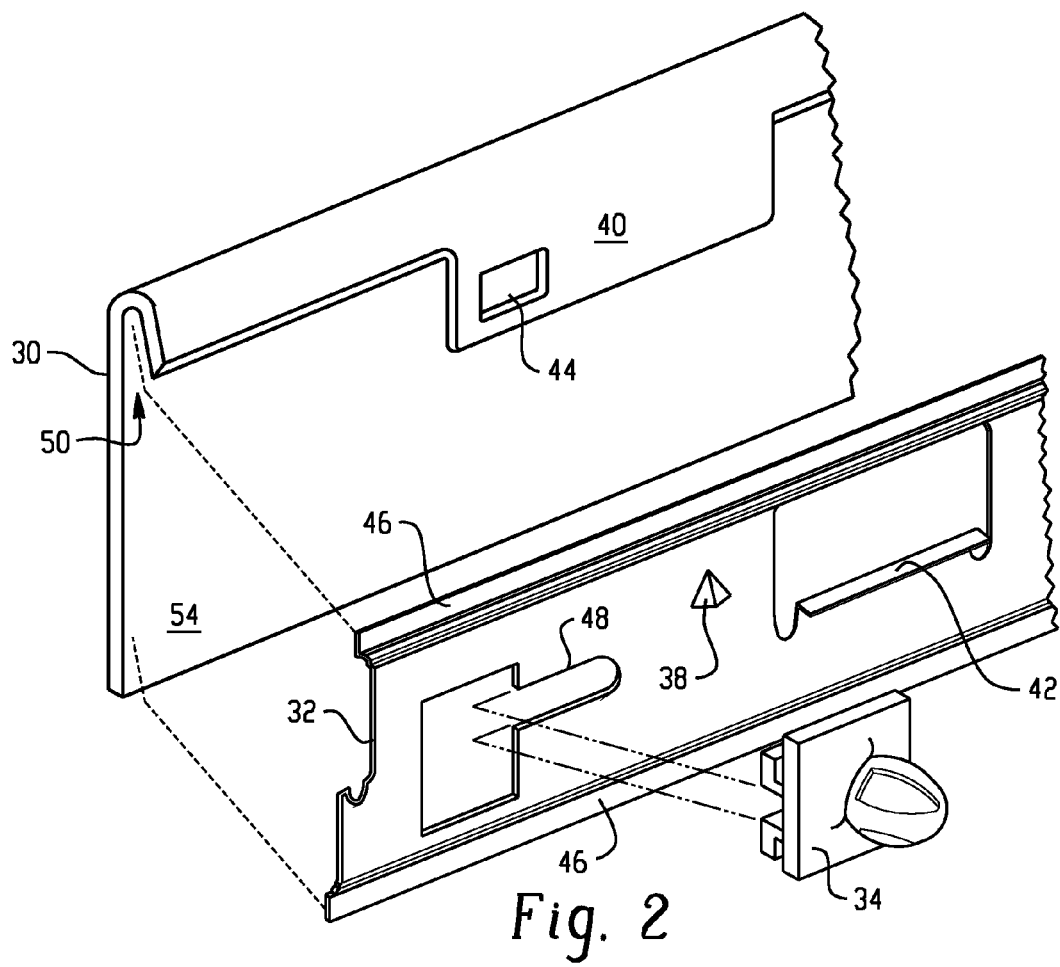
FIG. 2 is an exploded view of the assembly of a component to a bracket according to an embodiment of the present invention.
Figure 3:
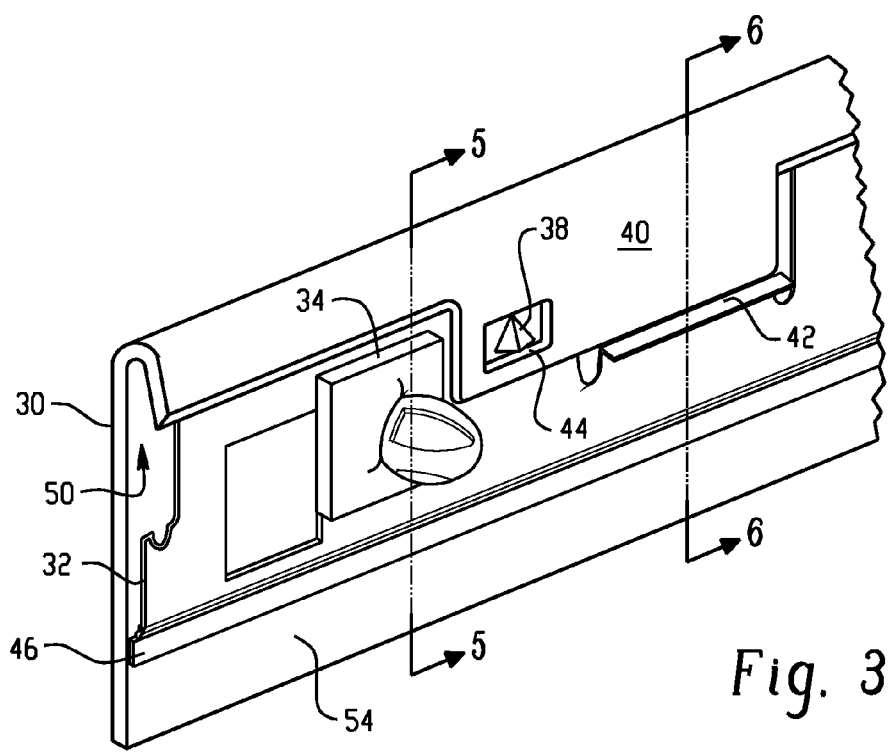
FIG. 3 depicts the component and bracket of FIG. 2 in an assembled condition.
Figure 4:
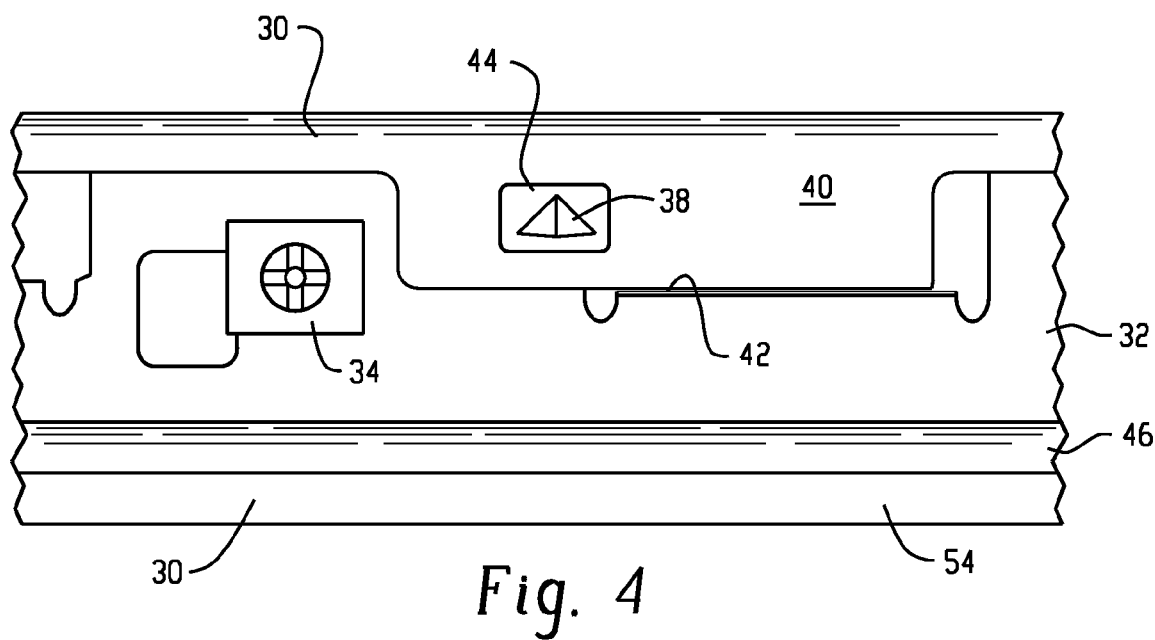
FIG. 4 is an elevational view of the assembled component and metal substrate of FIG. 3.

A system for attaching components to a substrate according to an embodiment of the present invention is shown in FIGS. 2 through 6. The general arrangement of the system is shown in FIGS. 2, 3 and 4 wherein a component 30 is assembled to a metal bracket 32. Bracket 32 includes one or more fasteners 34 coupled thereto for attaching the assembled component and metal bracket assembly to a substrate such as a vehicle body 36.

Component 30 may be any type of component suitable for assembly to a vehicle. Examples include, without limitation, fender flares, cladding, scoops, panels, ground effects and trim pieces attached to a vehicle or other suitable structure. Component 30 may further include one or more alignment apertures 44 and one or more lips 40, as shown in FIGS. 2-6.

Component 30 may be made from any suitable type of lightweight material, such as plastic, and may be finished with a decorative coating such as paint and/or clear-coating. Component 30 may also be molded from plastic having a desired color. In some embodiments component 30 may be made from other materials such as carbon fiber composites or metal.

With continued reference to FIGS. 2-6 viewed in combination, bracket 32 is a generally planar strip extending longitudinally and having a length generally corresponding to the length of component 30. Bracket 32 further includes one or more tabs 42, alignment elements 38 and flanges 46. Tabs 42 extend generally perpendicularly from bracket 32 toward vehicle body 36, while flanges 46 are generally parallel to the bracket. Bracket 32 further includes at least one fastener aperture 48 to which fastener 34 is coupled. Bracket 32 is generally formed from metal, such as steel, but may be produced from any other suitable material including, without limitation, other metals and alloys thereof, as well as plastics, composites or other non-metallic materials. Bracket 32 may be finished by any suitable coating or plating process to protect it from the environmental elements.

Fastener 34 may be any conventional type of fastener suitable for use with component 10, bracket 32 and vehicle body 36. Examples include, without limitation, plastic or metal clips, push-in fasteners, rivets, bolts, screws and lugs.

With reference to FIGS. 2-4, component 30 is coupled to bracket 32 by first attaching fasteners 34 to fastener apertures 48 such that the fasteners extend generally perpendicular to the bracket. Component 30 and bracket 32 are then assembled together by engaging alignment elements 38 with corresponding alignment apertures 44 and then sliding the bracket underneath lip 40. In this position flanges 46 are proximate component 30 and the flanges are in contact with the component, effectively wedging a portion of the bracket into a gap 50 formed by the component and lip 40.

Figure 5:
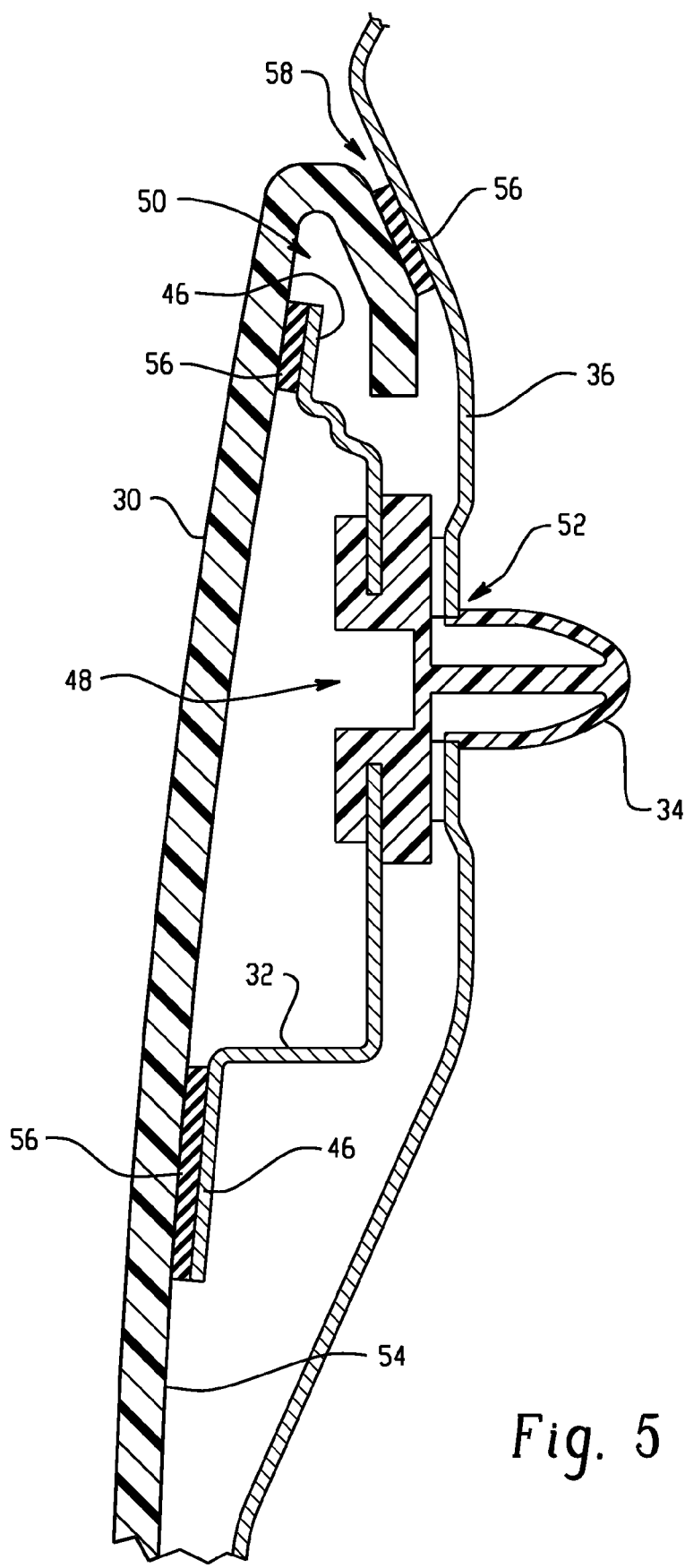
FIG. 5 is a view in section 5-5 of FIG. 3 showing details of the component, the bracket and a fastener.
Figure 6:
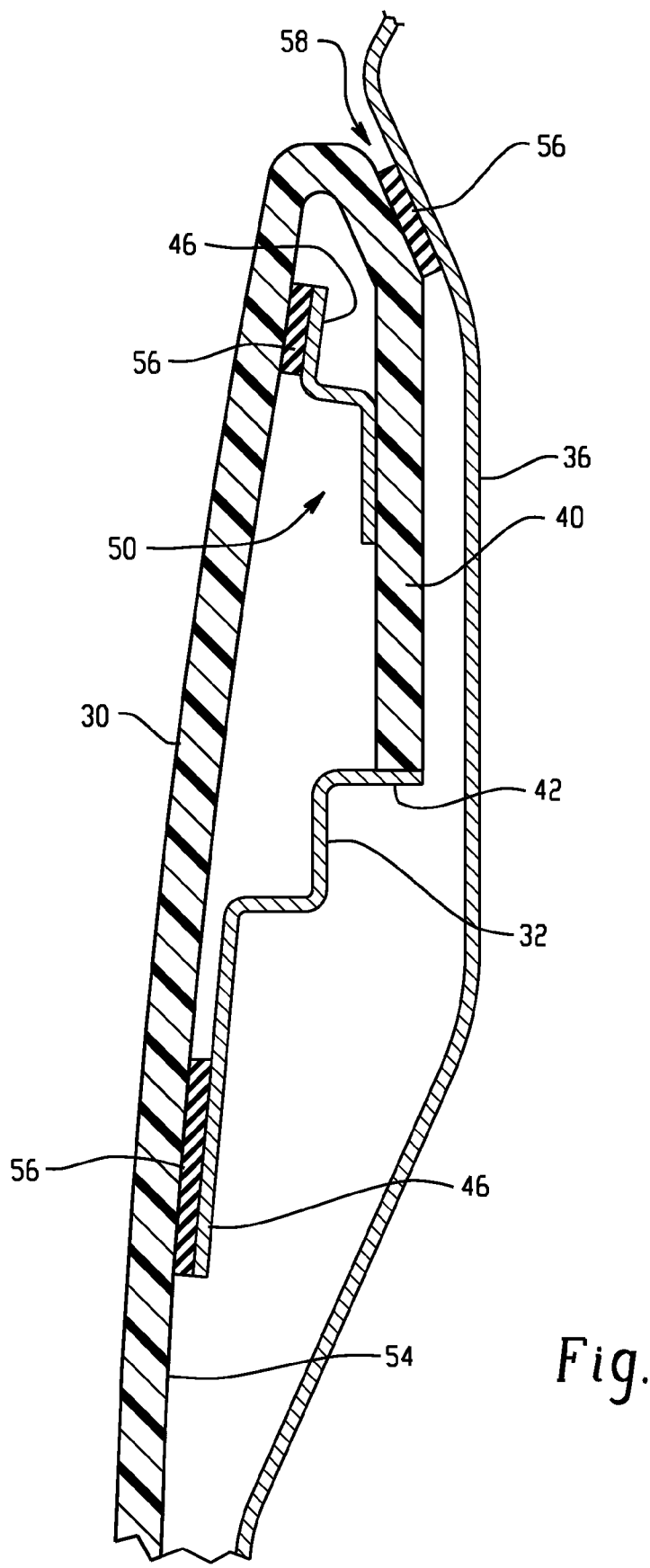
FIG. 6 is a view in section 6-6 of FIG. 3 showing details of the component, the bracket and a tab portion of the bracket.

Referring now to FIGS. 5 and 6, the assembled component 30 and bracket 32 are attached to vehicle 36 by first aligning fasteners 34 with corresponding mounting receptacles 52 on the vehicle and then engaging the fasteners to the receptacles. Component 30 is then pressed into place such that it moves downwardly in relation to bracket 32, causing the alignment elements 38 to disengage from alignment apertures 44 by moving away from the apertures and allowing lip 40 to come into contact with tabs 42. In the installed condition tabs 42 support the weight of component 30, which rests thereupon.

Once alignment elements 38 are disengaged from alignment apertures 44 lip 40 is able to move longitudinally along corresponding tab 42, thereby allowing component 30 to expand and contract with changes in temperature without binding or distorting the component's shape or surface. Likewise, interior surface 54 of component 30 is able to slide longitudinally along flanges 46. Despite this freedom of movement, component 30 is otherwise rigidly attached to vehicle body 36 by bracket 32 and fasteners 34.

A friction reducing element 56 may optionally be attached to flanges 46 to aid in decreasing friction between bracket 30 and component 32 as well as protecting the component from deformation caused by contact with the bracket. A contact area 58 between component 30 and bracket 32 may also include a friction reducing element 56 to assist in reducing friction and wear between the component and the bracket. Friction reducing element 56 may be made from felt, fabric, plastic, rubber or other materials, and may be provided in forms such as tape, pads, or bumpers, among others.

As can be seen, the present invention requires no attachment structures, such as recesses or "doghouses" for inserting fasteners to attach a component to a vehicle body. Attachment of component 30 to vehicle body 36 is accomplished entirely through the use of bracket 32 and interference to movement of the component via the bracket and the vehicle body after installation. Accordingly, component 30 may have a superior exterior surface without the undesirable slide marks or sink marks. The present invention also provides for a rigid attachment of component 30 to vehicle body 36 while allowing movement for thermal expansion and contraction of the panel material, thus preventing warping or deformation of the component.

In an alternate embodiment of the present invention a plurality of brackets 32 may be used in connection with a component 30. Likewise, a plurality of components 30 may be assembled to a single bracket 32 and a plurality of components may be assembled with a plurality of brackets. In still other embodiments bracket 32 may comprise one or more curved portions, such as to correspond to contours of vehicle body 36 instead of, or in addition to, a straight design as is depicted in the figures.

While this invention has been shown and described with respect to a detailed embodiment thereof, it will be understood by those skilled in the art that changes in form and detail thereof may be made without departing from the scope of the claims of the invention. For example, the present invention may be employed in other contexts such as attaching siding to a house or building, or retaining signage on a support structure, among others.

What is claimed is:

1. A system for attaching a component to a substrate, comprising:
    a bracket having at least one alignment element extending away from the bracket;
    at least one tab extending generally perpendicularly from the bracket;
    at least one fastener coupled to the bracket and engageable to the substrate; and
    a component having a lip and a gap defined by the lip and an interior surface of the component, the lip further including at least one alignment aperture sized and shaped to engage the alignment element of the bracket,
    the component being coupled to the bracket such that the bracket at least partially engages the gap, the lip being atop and resting upon the tab, and
    the component being attached to the substrate when the fastener is engaged with the substrate.

2. The system of claim 1 wherein the lip slidably contacts the tab.

3. The system of claim 2 wherein the component is slidably movable relative to the bracket as the component expands and contracts with variations in temperature.

4. The system of claim 1 wherein the component comprises a plurality of lips that contact corresponding tabs of the bracket.

5. The system of claim 1 wherein the alignment element is disengageable from the alignment aperture when the component is attached to the substrate.

6. The system of claim 1 wherein the bracket further comprises at least one flange facially adjacent an interior surface of the component.

7. The system of claim 6, further comprising a friction reducing element interposed between the flange and the interior surface of the component.

8. The system of claim 1 wherein the bracket is made from one of a plastic, metal and composite material.

9. The system of claim 1 wherein the component is made from one of a plastic, metal and composite material.

10. The system of claim 1 wherein the fastener is at least one of a clip, push-in fastener, rivet, bolt, screw and lug.

11. The system of claim 1 wherein the component is one of a fender flare, cladding, scoop, panel, ground effect and trim piece.

12. The system of claim 1 wherein the bracket comprises a plurality of brackets.

13. The system of claim 1 wherein the component comprises a plurality of components.

14. The system of claim 1 wherein the bracket comprises a plurality of brackets and the component comprises a plurality of components.

15. The system of claim 1 wherein the bracket is longitudinal.

16. The system of claim 1 wherein the bracket includes a curved portion.

17. A system for attaching a component to a substrate, comprising:
   a bracket having at least one tab extending generally perpendicularly from the bracket, at least one flange, and at least one alignment element;
   a friction reducing element attached to the flange;
   at least one fastener coupled to the bracket and engageable to the substrate; and
   a component having at least one lip, a gap defined by the lip and an interior surface of the component, and at least one alignment aperture sized and shaped to engage the alignment element of the bracket,
   the component being coupled to the bracket such that the lip slidably contacts the tab, the lip being atop and resting upon the tab, the flange is facially adjacent an interior surface of the component with the friction reducing element interposed therebetween, and the bracket at least partially engages the gap, the component being attached to the substrate when the fastener is engaged with the substrate.

18. A method for attaching a component to a substrate, comprising the steps of:
   providing a bracket;
   forming on the bracket at least one alignment element, the alignment element extending away from the bracket;
   extending at least one tab generally perpendicularly from the bracket;
   coupling at least one fastener to the bracket;
   providing a component having a lip and a gap defined by the lip and an interior surface of the component;
   forming on the lip at least one alignment aperture sized and shaped to engage the alignment element of the bracket;
   coupling the component to the bracket such that the lip of the component contacts the tab of the bracket, the lip being atop and resting upon the tab, and the bracket at least partially engages the gap; and
   engaging the fastener to a receptacle of the substrate such that the component is attached to the substrate.

19. The method of claim 18, further comprising the step of coupling the component to the bracket such that the lip slidably contacts the tab.

20. The method of claim 18, further comprising the steps of forming at least one flange on the bracket and positioning the flange facially adjacent the component.

21. The method of claim 20, further comprising the step of placing a friction reducing element between the flange and the component.

22. A system for attaching a component to a substrate, the system being produced according to the method of claim 18.

* * * * *